United States Patent [19]

Ackels et al.

[11] Patent Number: 5,863,118

[45] Date of Patent: Jan. 26, 1999

[54] BLENDER WITH EXTENDIBLE HOUSING

[75] Inventors: Paul Ackels, Simsbury; Robert Kubicko, Southbury; Roger Letso, Sandy Hook, all of Conn.

[73] Assignee: Conair Corporation, Stamford, Conn.

[21] Appl. No.: 902,016

[22] Filed: Jul. 29, 1997

[51] Int. Cl.$^6$ ............................. A47J 43/044; B01F 7/16
[52] U.S. Cl. .......................................... 366/129; 366/286
[58] Field of Search .................................. 266/129, 130, 266/197, 285, 286, 331, 342, 343; 99/348

[56] References Cited

U.S. PATENT DOCUMENTS

| | | |
|---|---|---|
| D. 271,176 | 11/1983 | Zimnowicz . |
| D. 321,811 | 11/1991 | Littmann . |
| D. 361,241 | 8/1995 | Littmann . |
| 3,299,924 | 1/1967 | Hanschitz ............................. 366/129 X |
| 3,333,830 | 8/1967 | Spingler et al. ........................ 366/129 |
| 3,355,153 | 11/1967 | Nolte, Jr. ................................. 366/286 |
| 4,008,883 | 2/1977 | Zubieta . |
| 4,054,272 | 10/1977 | Cooke . |
| 4,071,789 | 1/1978 | Ernster et al. . |
| 4,368,986 | 1/1983 | Fischer . |
| 4,850,699 | 7/1989 | Rebordosa . |
| 5,129,589 | 7/1992 | Papaleo et al. . |
| 5,360,170 | 11/1994 | Cartellone . |
| 5,366,286 | 11/1994 | Ruttimann ............................... 366/129 |
| 5,368,384 | 11/1994 | Duncan et al. ......................... 366/129 |
| 5,488,898 | 2/1996 | Hough . |
| 5,533,801 | 7/1996 | Safont et al. . |

FOREIGN PATENT DOCUMENTS

| | | | |
|---|---|---|---|
| 567869 | 12/1958 | Canada .................................. 366/129 |
| 1170120 | 5/1964 | Germany ............................... 366/129 |
| 1242817 | 6/1967 | Germany ............................... 366/331 |
| 954180 | 4/1964 | United Kingdom ................... 366/129 |
| 2213399 | 8/1989 | United Kingdom ................... 366/129 |

*Primary Examiner*—Charles E. Cooley
*Attorney, Agent, or Firm*—Ohlandt, Greeley, Ruggiero & Perle

[57] ABSTRACT

A blender includes a housing with a lower portion and an intermediate portion, the lower portion being movable in relation to the intermediate portion to permit the housing to be extended during use. The housing encloses a motor and a shaft extending axially in the housing. The shaft has a first part and a second part, wherein the first part is coupled to and rotated by the motor, and the second part is slidably coupled to a blending blade structure. A coupler links the blending blade structure to the lower portion of the housing, to enable the blending blade structure to move axially in tandem with the lower portion of the housing.

12 Claims, 2 Drawing Sheets

FIG. 3.
FIG. 4.
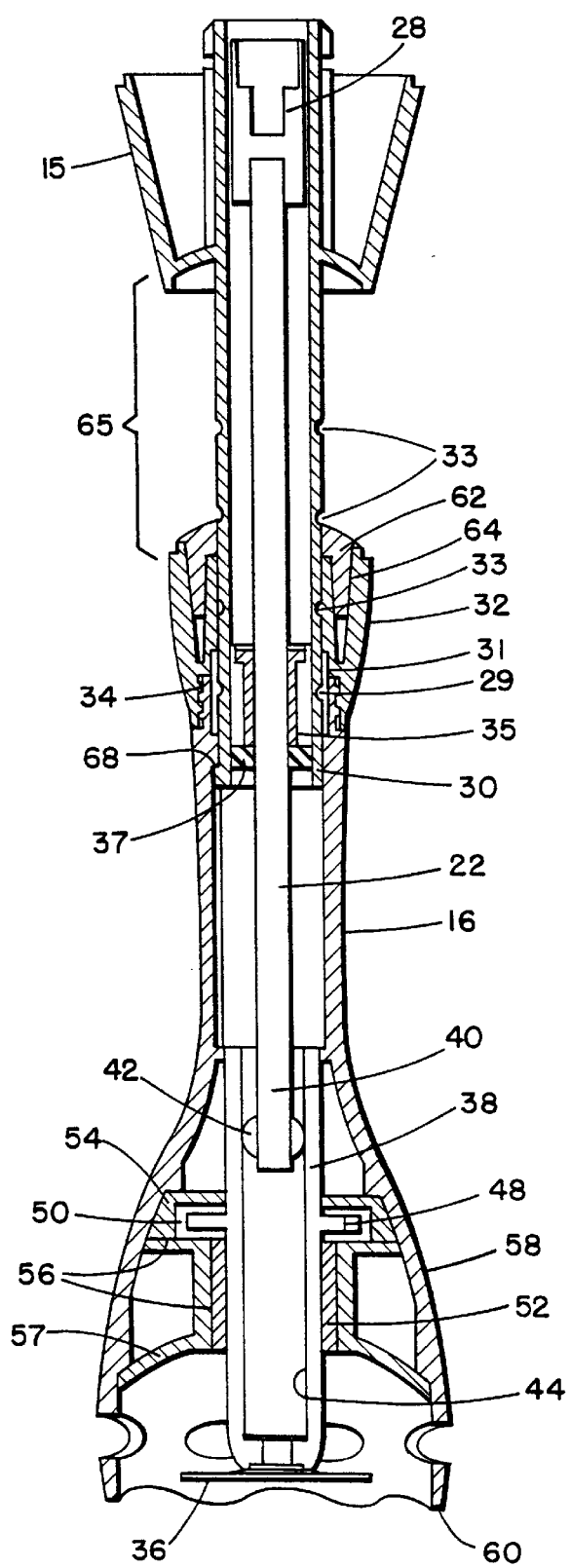
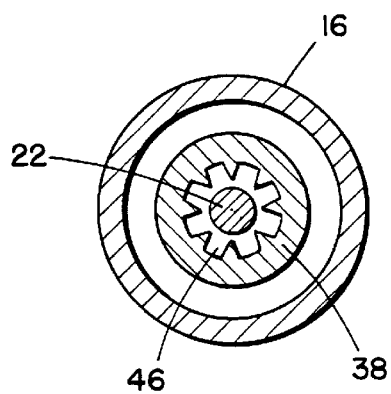

5,863,118

BLENDER WITH EXTENDIBLE HOUSING

FIELD OF THE INVENTION

The present invention relates to a blender having an extendible housing. More particularly, the present invention relates to a hand-held blender having a housing that can be lengthened by moving one housing element relative to another housing element. The blending blade of the hand-held blender can be linked to the one housing element to permit the blending blade and the housing element to move together.

BACKGROUND OF THE INVENTION

Hand-held blenders known in the art are subject to certain limitations. One of these is the inability of the blenders to accommodate the wide variety of containers with which they will be used. When blending food items in short, wide mouthed bowls, a shorter blender is useful to provide control. On the other hand, in a long, thin container having a narrow mouth, it is preferable to have a longer blender to reach the bottom of the container.

Typically, the user of the blender must accommodate these differing conditions by changing hand position or by substituting different containers. In addition, certain existing blenders allow one blending attachment to be removed and another substituted in its place. Each of these accommodations requires effort by the user, however, and may not provide optimal results.

The present invention provides several novel structures to address those problems and provides an improved hand-held blender.

SUMMARY OF THE INVENTION

The present invention is a hand-held blender with a housing having a lower portion and an intermediate portion, the lower portion being movable in relation to the intermediate portion to permit the lower portion to be extended during use. The housing encloses a motor and a shaft extending axially in the housing. The shaft has a first part and a second part, wherein the first part is coupled to and rotated by the motor, and the second part is slidably coupled to a blending blade structure. A coupler links the blending blade structure to the lower portion of the housing, to enable the blending blade structure to move axially in tandem with the lower portion of the housing.

BRIEF DESCRIPTION OF THE DRAWINGS

FIG. 3 is a cross-sectional view of the attachment of FIG. 2 in an extended state, shown without a stand.

FIG. 4 is a perpendicular cross-sectional view of the attachment of FIG. 2, through the line 4—4.

DESCRIPTION OF THE PREFERRED EMBODIMENTS

Figure 1:
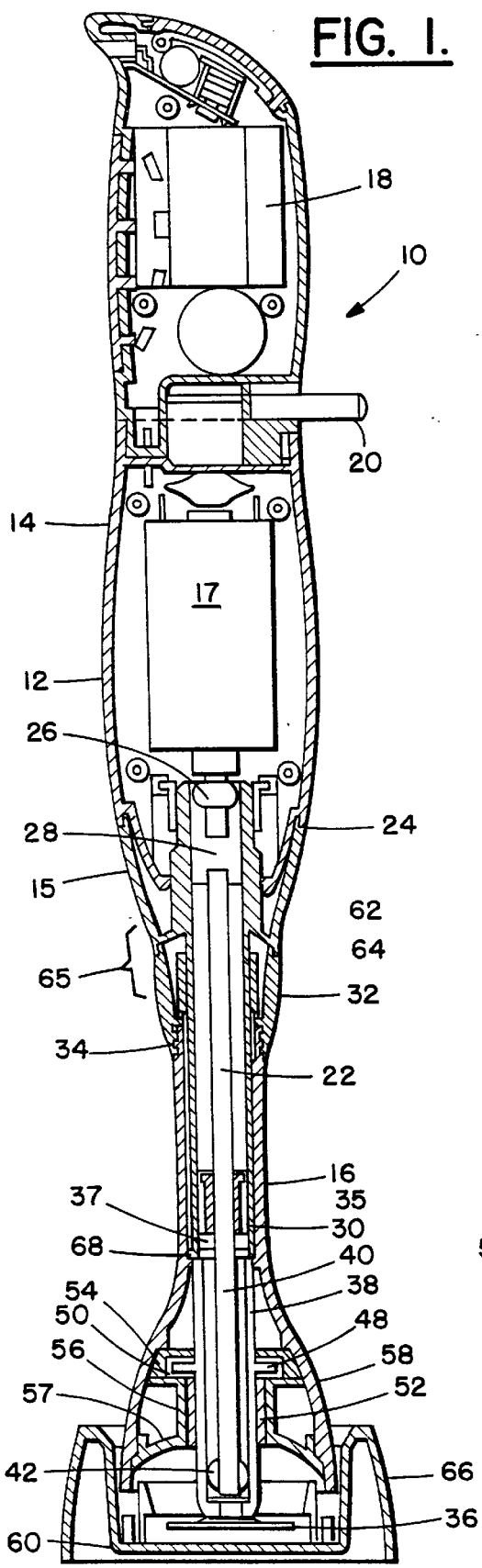
FIG. 1 is a cross-sectional view of a hand-held blender and a supporting stand according to the present invention.

Hand-held blender assembly 10, shown in FIG. 1, includes housing 12. Housing 12 includes an upper portion 14 (which in this embodiment will also be referred to as a motor housing), an intermediate portion 15 (which in this embodiment will also be referred to as a motor housing interface) and a lower portion 16. Lower portion 16 is movable in relation to intermediate portion 15 to permit the length of housing 12 to be extended prior to or during use. This unique feature permits blender assembly 10 to adapt to varying container depths. For wider, shallower bowls, a shorter housing length can be used to provide maximum control, and for narrower, taller containers, housing 12 can be extended to permit the blender assembly to reach the bottom of the container.

Upper portion 14 is shaped to be gripped in one hand of the user. Upper portion 14 preferably contains a motor 17 to power blender assembly 10. In the embodiment depicted in FIG. 1, motor 17 is powered by rechargeable battery 18. Accordingly, upper portion 14 is equipped with a plug 20 for direct connection to a household electrical outlet, to enable charging of battery 18. Alternatively, motor 17 can be powered by direct connection to an electrical supply. In such a case, an electrical cord (not shown) is provided.

Motor 17 is linked, directly or indirectly, to rotatable shaft 22, which extends axially into housing 12. In the embodiment depicted in FIG. 1, upper portion 14 is fully detachable from lower and intermediate portions 16,15. Accordingly, upper portion 14 is provided wit annular lip 24, which engages an indentation on intermediate portion 15. Moreover, motor 17 is directly linked to rotating pin 26, which is, in turn, detachably coupled to shaft 22. Motor 17 causes rotating pin 26 to rotate, and rotating pin 26, through connector 28, causes shaft 22 to rotate. Connector 28 is shaped to accept rotating pin 26 and shaft 22, to allow rotating pin 26 to drive shaft 22. Rotating pin 26 can thus be considered a first part of shaft 22.

The embodiment depicted in FIG. 1 is a blender assembly 10 having a fully detachable upper portion 14. In the alternative, upper portion 14 and intermediate portion 15 can be permanently joined, or can comprise a single integral piece. This construction would provide a non-detachable blender assembly 10.

Figure 2:
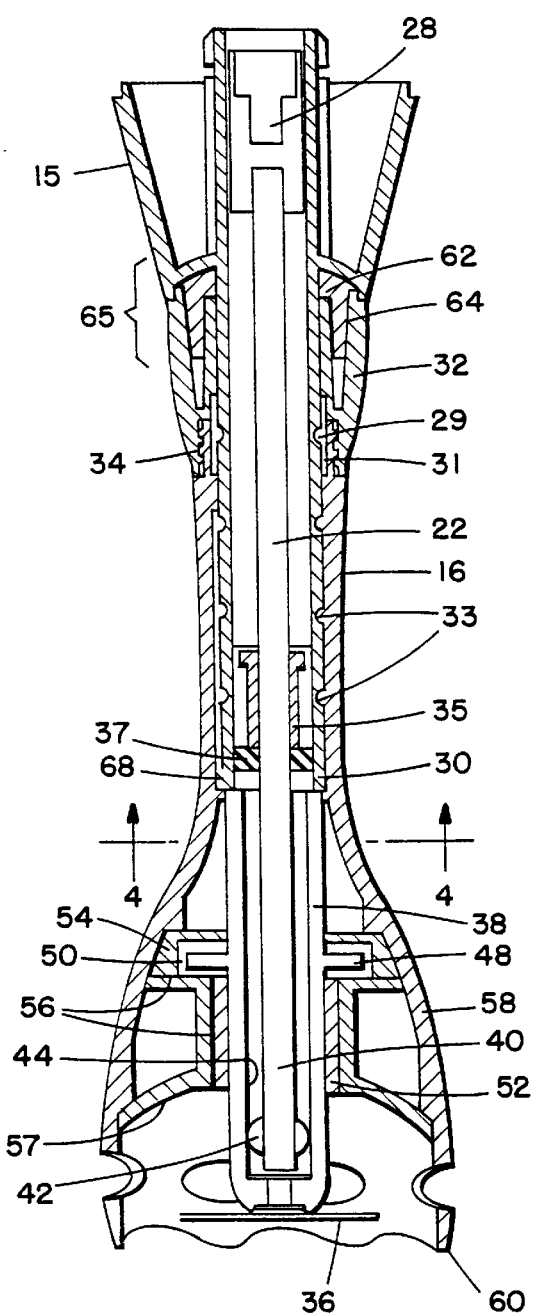
FIG. 2 is a cross-sectional view of the attachment of the hand-held blender of FIG. 1 in a retracted state, shown without a stand.

As seen in FIGS. 1 through 3, lower portion 16 is slidably attached to intermediate portion 15. This construction provides the unique extendible housing of the present invention. Intermediate portion 15, once assembled to upper portion 14, remains fixed with respect thereto. Lower portion 16 is movably affixed to intermediate portion 15. To facilitate this, intermediate portion 15 includes a tube 30, which extends through a part of lower portion 16 along part of the length of shaft 22.

As best seen in FIGS. 2 and 3, lower portion 16 can be adjusted and locked to tube 30 by means of compression ring 32. Compression ring 32, which is adjoined to the body of lower portion 16 by mating threads 34, releases pressure on tube 30 when it is turned in a counterclockwise direction. Lower portion 16 can thus slide along tube 30 to provide the desired housing length. When lower portion 16 is in the desired position (see, e.g., FIG. 3), compression ring 32 can then be turned in a clockwise direction to tighten compression ring 32 onto tube 30, thus holding lower portion 16 in place with respect to intermediate portion 15.

To facilitate this process, tube 30 preferably has multiple equidistant annular notches 33 about its circumference. A washer 31 having a raised rib 29 is seated within compression ring 32. Raised rib 29 lightly engages notches 33 as it passes over them, and when compression ring 32 is tightened, washer 31 serves to secure lower portion 16 tightly in place on tube 30.

A sealing cap 62 can also be disposed on an engaging surface 64 of lower portion 16 of the housing 12, adjacent the intermediate portion 15 of the housing 12. This sealing cap 62 provides a seal about the top of compression ring 32 to prevent food or other materials from accumulating within it. Preferably, resilient cap is formed of the same material the housing 12 is made of, such as ABS.

In addition, a checking nub 68 is provided on the lower extremity of tube 30, to prevent lower portion 16 from becoming disengaged from intermediate portion 15. Checking nub 68 defines the maximum housing length attainable by the blender assembly 10. Checking nub 68 preferably is not annular, but is a discrete nub. Checking nub 68 can then run in a vertical groove (not shown) in the inner surface of lower portion 16. This prevents lower portion 16 (except for compression ring 32) from rotating about tube 30. Furthermore, it is preferred that a bushing 35 and rubber washer 37 be mounted within tube 30 about shaft 22, to stabilize shaft 22 during its rotation.

While the extension of lower portion 16 alone provides enhanced utility, it is preferable that the blending blade structure (which includes blending blade 36 and rotatable sleeve 38 mounted thereto) of blender assembly 10 also extend along with lower portion 16, to ensure that the food material to be blended can be directly and fully contacted by blending blade 36. Further, such combined extension assures that blade 36 is always within the enveloping skirt of lower portion 16, as discussed more fully below. Accordingly, the present invention provides a construction for permitting blending blade 36 to extend and adjust in tandem with lower portion 16.

As shown in FIGS. 1 through 3, blending blade 36 is mounted to a rotatable sleeve 38. Rotatable sleeve 38 mates with a second part 40 of shaft 22. Shaft 22 is slidably linked to rotatable sleeve 38 by protrusions 42 projecting therefrom. Protrusions 42, which in the depicted embodiment are two semi-circular plates projecting from opposing sides of shaft 22, engage inner surface 44 of sleeve 38. Inner surface 44 of sleeve 38 (which in this embodiment is a rifled shaft clutch) is preferably formed with a plurality of axial channels 46, as shown in FIG. 4, to slidably engage protrusions 42. This enables shaft 22 to rotate sleeve 38 and blending blade 36 without limiting the ability of sleeve 38 to move axially along shaft 22. As long as protrusions 42 are engaged at some point within axial channels 46, shaft 22 will be coupled to blending blade 36, and will cause blending blade 36 to rotate.

To couple blending blade 36 to lower portion 16, sleeve 38 is provided with a projection 48 about a circumference thereof. Projection 48 is preferably an annular tooth, but it may consist of one or more discrete non-annular projections. To mate with projection 48, lower portion 16 is provided with an annular channel 50 about an interior surface thereof. This annular channel 50 is preferably formed from the adjoining surfaces of: a low-friction sleeve 52 mounted about the sleeve 38; a low-friction insert 54; and the internal housing elements 56 on which the low-friction sleeve 52 and low-friction insert 54 are mounted. One such internal housing element 56 is ABS capturing ring 57. Capturing ring 57 forms a shield that is designed to prevent food products from entering the internal mechanisms of blender assembly 10. These structures collectively adjoin to form annular channel 50. It is preferred that the low-friction surfaces be formed of a polymeric material such as Delrin.

Annular channel 50 accepts projection 48 of sleeve 38, to enable sleeve 38, and hence blending blade 36, to move axially in conjunction with lower portion 16. Projection 48 of sleeve 38 is free to rotate within channel 50, facilitated by the low-friction surfaces of channel 50. Moreover, axial movement of lower portion 16 causes equivalent axial movement of projection 48, sleeve 38, and blending blade 36. Accordingly, blending blade 36 maintains its optimal position within lower portion 16 whether the housing is extended or unextended. Blending blade 36 remains fully shielded by the lower part, or skirt 58, of lower portion 16, but also remains adjacent to the lower lip 60 of skirt 58 to provide optimal blending function. Skirt 58 is preferably perforated adjacent blending blade 36, to permit the food item to be blended to contact the blending blade 36 more fully.

Other preferred components are depicted in the figures. As shown in FIG. 1, blender assembly 10 or lower and intermediate portions 16,15 thereof (also referred to collectively as blender attachment 65) can be stored in a stand 66.

Various modifications may be made as will be apparent to those skilled in the art. Thus, it will be obvious to one of ordinary skill in the art that the foregoing description and drawings are merely illustrative of certain preferred embodiments of the present invention, and that various obvious modifications can be made to these embodiments in accordance with the spirit and scope of the appended claims.

What is claimed is:

1. A blender comprising:
    a housing enclosing a motor and having a lower portion and an intermediate portion, said lower portion being movable in relation to said intermediate portion to permit said lower portion to be extended with respect to said intermediate portion;
    a blending blade structure;
    a shaft extending axially in said housing, said shaft having a first part and a second part, wherein said first part is coupable to said motor for rotation thereby, and said second part is slidably coupled to said blending blade structure; and
    coupling means for coupling said blending blade structure to said lower portion of said housing, thereby to enable said blending blade structure to move axially in tandem with said lower portion of said housing, said coupling means including an annular channel about an interior surface of said lower portion of said housing, said blending blade structure further comprising a rotatable sleeve having a blending blade mounted thereon, said rotatable sleeve having at least one projection about a circumference thereof adapted to rotate within said annular channel, so as to enable said rotatable sleeve to move axially with said lower portion of said housing.

2. The blender of claim 1, wherein said at least one projection is an annular tooth.

3. The blender of claim 1, wherein said first part of said shaft is slidably coupled to said blending blade structure by at least one protrusion on said first part of said shaft, said at least one protrusion being formed to slidably engage said rotatable sleeve, so as to enable relative sliding movement therebetween. movement of said lower portion of said housing and said blending blade structure at a fully extended position, and to prevent complete separation of said intermediate portion of said housing from said lower portion of said housing.

4. The blender of claim 3, wherein said rotatable sleeve has an inner surface with at least one axial channel in which said at least one protrusion slides.

5. The blender of claim 1, wherein said lower portion of said housing includes a compression locking ring for holding said lower portion of said housing in a fixed position relative to said intermediate portion of said housing.

6. The blender of claim 5, wherein said compression locking ring includes a threaded outer ring and a threaded inner surface.

7. The blender of claim 5, further comprising a resilient cap disposed on an engaging surface of said lower portion of said housing, said engaging surface of said lower portion of said housing located adjacent said intermediate portion of said housing.

8. The blender of claim 1, wherein said coupling means includes stop means to stop axial Movement of said lower portion of said housing and said blending blade structure at a fully extended position, and to prevent complete seperation of said intermediate portion of said housing from said lower portion of said housing.

9. The blender of claim 1, wherein said lower portion of said housing includes a skirt portion, said skirt portion enclosing and moving with said blending blade structure, so that said blending-blade remains within said skirt during use.

10. The blender of claim 1, wherein said housing further comprises an upper portion, wherein said motor is mounted within said upper portion, and said upper portion is detachable from said lower and intermediate portions.

11. A blender attachment, comprising:

a motor housing interface, said motor housing interface including means for attachment to a motor housing;

a rotatable shaft having a first part and a second part, said first part of said rotatable shaft being rotatably mounted within said motor housing interface;

a blending blade structure slidably coupled to said second part of said rotatable shaft and including a blending blade; and a skirt seated about said second part of said rotatable shaft, encompassing said blending blade, and including apertures therein to allow circulation of a material being blended around said blending blade, wherein said skirt is movable with said blending blade and with respect to said motor housing interface.

12. The blender attachment of claim 11, wherein said blending blade is mounted to a rifled shaft clutch, and said second part of said rotatable shaft includes at least one protrusion adapted to engage said rifled shaft clutch, thus enabling said shaft to rotate said a blending blade.

* * * * *